United States Patent Office 3,519,782
Patented July 7, 1970

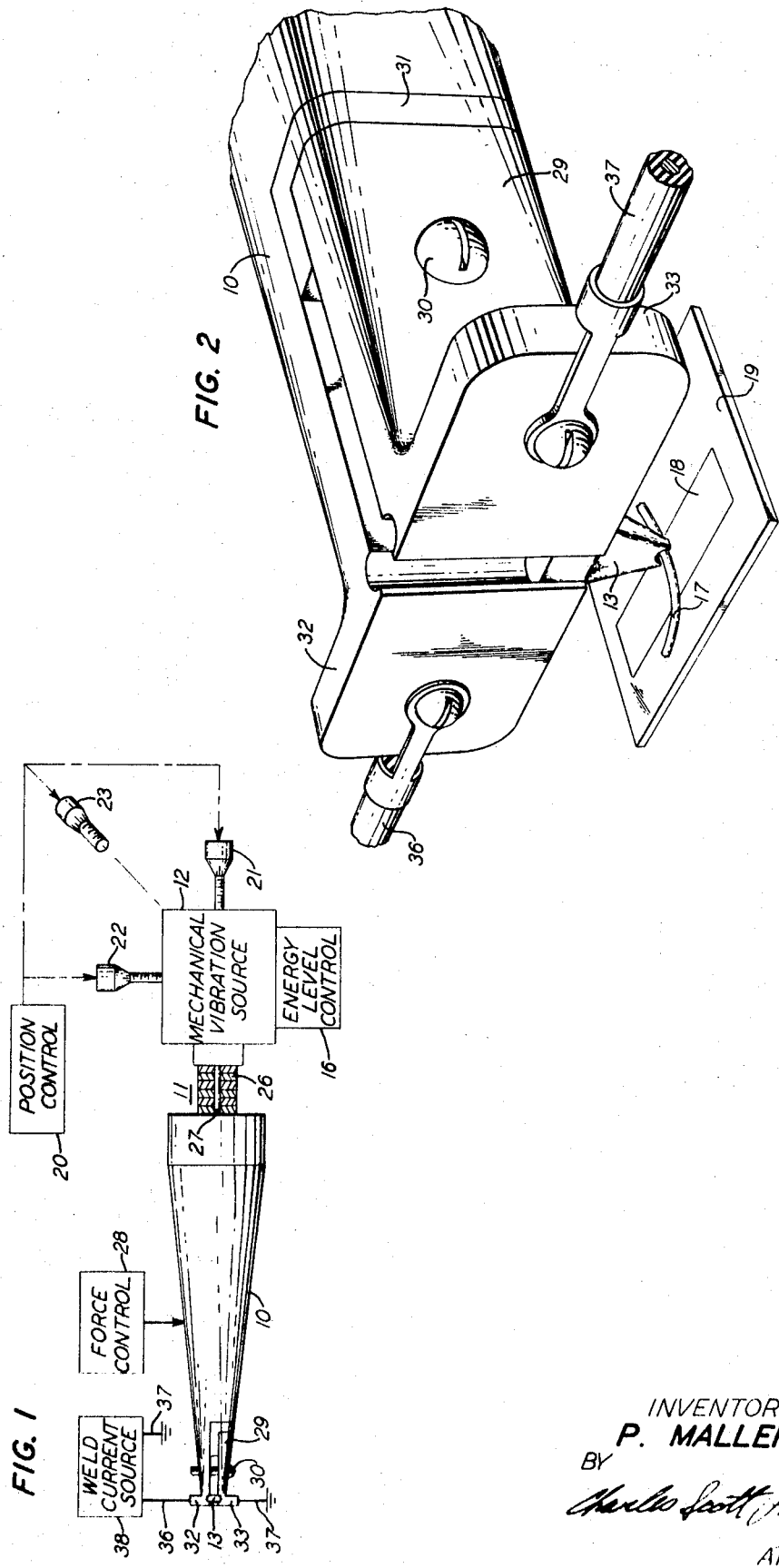

---

3,519,782
PRECISION ELECTRIC WELDER
Paul Mallery, Murray Hill, N.J., assignor to Bell Telephone Laboratories, Incorporated, Murray Hill and Berkeley Heights, N.J., a corporation of New York
Filed Dec. 13, 1966, Ser. No. 601,492
Int. Cl. B23k 9/00
U.S. Cl. 219—78                                 9 Claims

ABSTRACT OF THE DISCLOSURE

A welding head is provided with transverse flanges for receiving current pulses to heat a welding tip secured therebetween. The heat of the tip is thermally conducted to weldments. Mechanical vibrations are applied to the welding head for inducing a minute relative motion between weldments. The position of the welding head is controlled by mechanical adjusting apparatus to a position which is relatively independent of thermal expansion effects in the welding head.

---

BACKGROUND OF THE INVENTION

This invention relates to apparatus for realizing bonds between structural members, such apparatus often being generically denominated "welding apparatus." The invention relates in particular to welding apparatus in which heat is applied to the weldments by thermal coupling from a heat source such as an electrically heated welding head. The term "welding" and its various derivatives are used in the present application in the broad generic sense of securing two contiguous members together by the initiation of some form of interaction directly between such members at their contiguous surfaces.

It is known to apply the heat necessary for welding by thermal coupling from an electrically heated member. It is also known to use various heat levels together with various combinations of levels and frequencies of mechanical vibration energy for inducing relative motion between weldments in a direction which is parallel to their common interface. However, in the present state of the art there is no welding apparatus which can conveniently achieve a weld in a low temperature environment where at least one of the weldments has a high thermal conductivity and where a high degree of precision is required in defining the location at which a weld is to be achieved. An example of such a welding problem is an application wherein it is necessary to weld a copper wire of about 0.001-inch diameter to a gold film deposited on an epoxy substrate.

It is, therefore, one object of the present invention to facilitate the definition of a welding point with a high degree of precision.

It is another object to weld fragile materials.

A further object is to weld materials having a high thermal conductivity.

SUMMARY OF INVENTION

A welding tip is electric-resistance heated by current pulses applied thereto transversely with respect to apparatus for positioning such tip.

It is one feature of the invention that the transverse application of the heating current causes any thermal expansion which does occur in the positioning apparatus to take place transversely with substantially no resulting welding tip displacement.

A further feature is that the application of welding current is achieved through flanges of thermal mass substantially higher than the thermal mass of the welding tip, thereby minimizing any heating of the driving apparatus.

Yet another feature is that the welding tip is shaped to favor heat conduction to the welding contact area of the tip.

Still another feature of the invention is that the positioning apparatus is tunably coupled to an output of a source of mechanical vibrations for achieving maximum vibration transmission from the source to the aforementioned welding tip.

THE DRAWING

The previously outlined objects and features of the invention are realized in an illustrative embodiment shown in the attached drawing wherein:

FIG. 1 is a block and line diagram illustrating a welding apparatus in accordance with the invention; and FIG. 2 is a perspective view of a portion of the apparatus in FIG. 1.

DETAILED DESCRIPTION

In FIG. 1 a horn member 10 receives mechanical vibrations through a tunable coupling 11 from a source 12 of mechanical vibrations. The vibrations thus received are transmitted along the horn member to a welding tip 13 which is shown in top view in FIG. 1 and in perspective in FIG. 2.

Source 12 comprises any vibrational source known in the art for producing mechanical vibrations in frequency and amplitude ranges known to be useful in welding applications. For example, such sources often comprise an electrically driven magnetostrictive member which produces minute vibrations of amplitude and frequency that are variable by adjusting the corresponding amplitude and frequency of an electrical drive. Such amplitude and frequency control are schematically represented in FIG. 1 by an energy level control 16 coupled to the source 12.

The position of the welding tip 13 is determined at least in part by fixing the position of the source 12 with respect to the weldments (which are shown only in FIG. 2). For purposes of illustration, the weldments shown comprise a wire 17 which is to be welded to a film 18 on any suitable substrate member 19. Many forms of apparatus are known in the art for achieving control of the position of the welding tip 13; and such control is, therefore, only schematically indicated in FIG. 1. The latter indication comprises a position control source 20 having its output coupled to three coordinate micrometer position adjusting members 21, 22, and 23 for fixing the position of source 12 in a known location in space with respect to the aforementioined weldments.

The tunable coupling 11 comprises a threaded coupling 26 between the horn 10 and the source 12 and a plurality of spacing shims, or washers 27 which fix the spatial relationship between horn 10 and source 12 as held by threaded coupling 26. These shims thus also affect the mechanical impedance presented to the output and the source 12; and, by setting an appropriate diameter and number of shims, optimum vibration transmission can be realized to the tip 13 for a particular horn 10 and for a particular mechanical loading of such horn.

A force control source 28 is provided to raise and lower horn 10 in a plane which is perpendicular to the plane in the drawing, as may be determined by a prearranged program or by manual operation. The force control source 28 raises and lowers horn 10 through a fixed predetermined arc to facilitate change of weldments and it also includes means for fixing the amount of force applied through tip 13 in the vertical direction, as illustrated in FIG. 2, to the weldments.

In FIG. 2 a second, or holding, horn member 29 is secured to the member 10 by means of a screw 30 that is made of an electrical insulating material. An epoxy spacer 31 is inserted between the horn members 10 and 29 for cooperation with the screw 30 to secure such members in spaced relationship and insulated electrically from one another in portions apart from tip 13. The members 10 and 29 have traversely extending flanges 32 and 33, respectively, of electrical conducting material at the ends thereof. The tip 13 is secured between such flanges by means of the holding force applied by the screw 30. Flanges 32 and 33 also provide electrical connection terminals for circuit leads 36 and 37, respectively which connect such flanges to the output of a welding current source 38 in FIG. 1.

Source 38 advantageously provides current pulses of selectable magnitude duration and occurrence time by selection means not shown in detail but included within the source 38. Such selection means are well known in the art. One pulse is advantageously provided for each weld. In many applications it is advantageous to bring the tip 13 into engagement with the weldments, before current application, by operation of force control 28 to check the position of the tip with respect to the weldments. Then, if the desired positional accuracy is confirmed, source 38 is activated to apply the predetermined pulse of current.

The energy content of each pulse from source 38 is selected, in consideration of the thermal characteristics of the flanges 32 and 33 and the tip 13, to apply to the weldments the desired amount of heat for the materials involved when the tip 13 is in contact with the wire 17 and the pulse from source 38 is applied. Flanges 32 and 33 advantageously have a much greater thermal mass than does the tip 13. Consequently, the tip is heated by each current pulse to a much higher temperature than are the fingers 32 and 33 by the transverse flow of current therethrough between leads 36 and 37. The transverse current path through the flanges restricts current thereto. Consequently, there is virtually no heating of horn portions apart from flanges 32 and 33 and no significant tip displacement in the direction of the horn longitudinal axis. The flanges dissipate heat generated therein rapidly so that here is little, if any, expansion thereof, and such expansion as does occur is principally along the longitudinal flange axis, perpendicular to the horn longitudinal axis. Any such expansion along the flanges exerts substantially equal and oppositely directed transverse forces on the horn and produces no significant tip displacement. The tip 13 has a wedge-like tapered configuration in the portion thereof which extends transversely with respect to horn member 10 below the flanges 32 and 33. This tapered configuration encourages the conduction of heat from the main body of the tip 13 toward the convergence of the taper surfaces.

In one embodiment steel flanges 32 and 33 were employed to secure a tungsten carbide tip 13 in the illustrative position for welding a 3 mil copper wire 17 to a gold film 18 on the alumina substrate 19. The tip 13 that was employed was about 5/32 of an inch long and about 1/16 of an inch wide at its clamping point between flanges 32 and 33. A small groove was formed in the converging extremity of the tip to mate with wire 17 for providing mechanical stability with respect thereto and improve thermal coupling thereto. During a welding operation a total vertical force of approximately 500 grams was applied to the weldments, and a current pulse in the range of 300 amperes to 500 amperes was applied to ½ second. Mechanical vibrations in the ultrasonic range were applied from the source 12 though the horn members 10 and 29 and the tip member 13 to the weldments in a longitudinal direction with respect to the wire 17 and the horn member 10. For any particular application the vibration energy level selected must be experimentally determined and in the indicated application a vibrational drive level of 5 to 20 watts using a drive source Model W–1040–TSL of the Sonobond Corporation was advantageously employed. These parameters produced welds which withstood pull tests of 80 grams. Neither the ultrasonic power nor the heat when applied separately was capable of welding the wire to the substrate.

In another application the combination of ultrasonic power and heat was able to weld .012 inch by .010 inch gold beam leads to lands on a soft epoxy circuit board. Ultrasonic power alone could not form this weld, and if sufficient heat were applied to form the weld, without the aid of ultrasonic power, the epoxy became so distorted that the device was destroyed.

Although the invention has been described in connection with a particular embodiment thereof, it is to be understood that additional embodiments and modifications, which will be obvious to those skilled in the art, are included within the spirit and scope of the invention.

What is claimed is:

1. In combination in an electric welder:
first and second welding head members, each of electrically conductive material,
means for securing said first welding head member to said second welding head member and for electrically insulating said first welding head member from said second welding head member,
a tip member of electrically conductive material held between said first and second welding head members by action of said securing means,
first and second transversely extending flanges adjacent said tip member, one of said flanges on each of said welding head members, said flanges extending in opposite directions with respect to one another away from said tip member, and
means applying electric current to a series path including said tip member and said first and second flanges.

2. A welder in accordance with claim 1 wherein said tip member extends in a first transverse direction with respect to said first member, and
said tip member having at an end thereof remote from said first and second members a portion of decreasing dimension for favoring the conduction of heat away from said members.

3. The welder in accordance with claim 1 wherein said first and second members each have a transversely extending flange adjacent to said tip member, and
said flanges extending in opposite direction with respect to one another away from said tip member, 4. The welder in accordance with claim 2 wherein said first and second members each have a transversely extending flange adjacent to said tip member, and
said flanges extending in opposite direction with respect to one another away from said tip member.

5. The welder in accordance with claim 3 wherein said flanges each have a much greater thermal mass than does said tip member.

6. A welder in accordance with claim 1 and further comprising
a source of mechanical vibrations, and
means adjustably coupling said first member to an output of said source to transmit said vibrations longitudinally along such member to said tip member.

7. The welder in accordance with claim 6 wherein said adjustable coupling means for said first member comprise means mechanically tuning said first member for optimum transmission of vibrational energy from said source to said tip member.

8. The welder in accordance with claim 7 in which said tuning means comprises
   means mechanically connecting said first member to said source with variable spacing therebtween, and
   spacing shims between said first member and said source and cooperating with said coupling means for transmitting mechanical vibrations to said first member.

9. The welder in accordance with claim 3 wherein said means applying current to said members comprises
   a source of current pulses,
   means connecting said pulses to a circuit including in series said flanges and said tip member therebetween, and
   said pulses being of sufficient magnitude to heat said tip member to a substantially higher temperature than the temperature of said flanges.

References Cited
UNITED STATES PATENTS

| | | | |
|---|---|---|---|
| 236,972 | 1/1881 | Ball | 219—233 X |
| 2,815,430 | 12/1957 | Weiss | 219—230 X |
| 3,384,283 | 5/1968 | Mims | 228—1 |

JOSEPH V. TRUHE, Primary Examiner

P. W. GOWDEY, Assistant Examiner

U.S. Cl. X.R.

219—119, 233